(12) United States Patent
Khojastepour et al.

(10) Patent No.: US 11,386,279 B2
(45) Date of Patent: Jul. 12, 2022

(54) EFFICIENT DECODING OF RFID TAGS BASED ON RELEVANT RN16 SELECTION

(71) Applicant: NEC Laboratories America, Inc., Princeton, NJ (US)

(72) Inventors: Mohammad Khojastepour, Lawrenceville, NY (US); Carlos Bocanegra, Boston, MA (US)

(73) Assignee: NEC Corporation

( * ) Notice: Subject to any disclaimer, the term of this patent is extended or adjusted under 35 U.S.C. 154(b) by 0 days.

(21) Appl. No.: 17/171,172

(22) Filed: Feb. 9, 2021

(65) Prior Publication Data

US 2021/0264122 A1 Aug. 26, 2021

Related U.S. Application Data

(63) Continuation-in-part of application No. 16/825,395, filed on Mar. 20, 2020, now Pat. No. 10,997,488.

(60) Provisional application No. 62/972,249, filed on Feb. 10, 2020, provisional application No. 62/836,131, filed on Apr. 19, 2019.

(51) Int. Cl.
| | |
|---|---|
| *H04Q 5/22* | (2006.01) |
| *G06K 7/10* | (2006.01) |
| *H04L 1/16* | (2006.01) |
| *G06K 9/62* | (2022.01) |

(52) U.S. Cl.
CPC ....... *G06K 7/10356* (2013.01); *G06K 9/6263* (2013.01); *H04L 1/1685* (2013.01); *H04L 1/1692* (2013.01); *G06K 2007/10514* (2013.01)

(58) Field of Classification Search
CPC ............ G06K 7/10356; G06K 9/6263; G06K 2007/10514; H04L 1/1685; H04L 1/1692; H04L 1/16
USPC ...................................................... 340/10.4
See application file for complete search history.

(56) References Cited

U.S. PATENT DOCUMENTS

| | | | |
|---|---|---|---|
| 2007/0001813 A1* | 1/2007 | Maguire | G06K 7/10356 340/10.2 |
| 2011/0273271 A1* | 11/2011 | Alicot | G06K 7/0008 340/10.1 |
| 2019/0081639 A1* | 3/2019 | Hanham | G06F 3/065 |
| 2019/0141666 A1* | 5/2019 | Luo | H04W 64/006 |

OTHER PUBLICATIONS

Carneiro et al., "Supervised Learning of Semantic Classes for Image Annotation and Retrieval", IEEE Transactions on Pattern Analysis and Machine Intelligence, Mar. 2007, pp. 394-410, vol. 29, No. 3.

(Continued)

*Primary Examiner* — Tanmay K Shah
(74) *Attorney, Agent, or Firm* — Joseph Kolodka (57) ABSTRACT

A computer-implemented method is provided for picking a 16-bit random sequence (RN16) and generating an acknowledgement packet in a tag reading session. The method includes decoding RN16s from signals received by a plurality of antennas by treating signal interference as noise. The method further includes selecting the RN16 from the decoded RN16s based on properties of the decoded RN16s and the signals from which they are decoded in the tag reading session. The method also includes generating the acknowledgement packet based on the selected RN16.

16 Claims, 7 Drawing Sheets

(56) References Cited

OTHER PUBLICATIONS

Ma et al., Minding the Billions: Ultra-wideband Localization for Deployed RFID Tags, MobiCom'17, Oct. 2017, pp. 248-260.
Ou et al., "Come and Be Served: Parallel Decoding for COTS RFID Tags", MobiCom'15, Sep. 2015, pp. 1-12.

* cited by examiner

EFFICIENT DECODING OF RFID TAGS BASED ON RELEVANT RN16 SELECTION

RELATED APPLICATION INFORMATION

This application is a Continuation-in-Part of U.S. Non-Provisional Application Ser. No. 16/825,395, filed on Mar. 20, 2020 which claims priority to U.S. Provisional Application No. 62/836,131, filed on Apr. 19, 2019, and claims priority to U.S. Provisional Application No. 62/972,249 filed on Feb. 10, 2020, all incorporated herein by reference in their entireties.

BACKGROUND

Technical Field

The present invention relates to object detection and more particularly to efficient decoding of RFID tags based on relevant RN16 selection from a set of responses on multiple receive antennas.

Description of the Related Art

Radio Frequency Identification (RFID) technology can be used in variety of applications such as inventory, tracking, localization, checkout, etc. Many verticals may benefit from these range of applications such as retail, home use, public services, libraries, transportation, warehouses, and so forth. There is an inherent fundamental limitation in the way that the current RFID system communicate with an RFID tags and in particular passive RFID tags. The limitation arises from the fact that by increasing the number of the tags that are in the range of a given reader, their replies will interfere and would cause mis-detection. Even though a collision avoidance scheme is considered in standards such as the RFID Gen II Standard, in areas with large population of RFID tags, not only the replies become more delayed from the tags, the collision still causes some tags to remain hidden from the interrogator. Hence, there is a need for an approach for crowded RFID reading.

SUMMARY

According to aspects of the present invention, a computer-implemented method is provided for picking a 16-bit random sequence (RN16) and generating an acknowledgement packet in a tag reading session. The method includes decoding RN16s from signals received by a plurality of antennas by treating signal interference as noise. The method further includes selecting the RN16 from the decoded RN16s based on properties of the decoded RN16s and the signals from which they are decoded in the tag reading session. The method also includes generating the acknowledgement packet based on the selected RN16.

According to other aspects of the present invention, a computer program product is provided for picking a 16-bit random sequence (RN16) and generating an acknowledgement packet in a tag reading session. The computer program product includes a non-transitory computer readable storage medium having program instructions embodied therewith. The program instructions are executable by a computer to cause the computer to perform a method. The method includes decoding RN16s from signals received by a plurality of antennas by treating signal interference as noise. The method further includes selecting the RN16 from the decoded RN16s based on properties of the decoded RN16s and the signals from which they are decoded in the tag reading session. The method also includes generating the acknowledgement packet based on the selected RN16.

According to yet other aspects of the present invention, a computer processing system for picking a 16-bit random sequence (RN16) and generating an acknowledgement packet in a tag reading session. The system includes a memory device for storing program code. The system further includes a processor device operatively coupled to the memory device for running the program code to decode RN16s from signals received by a plurality of antennas by treating signal interference as noise. The processor device further runs the program code to select the RN16 from the decoded RN16s based on properties of the decoded RN16s and the signals from which they are decoded in the tag reading session. The processor device also runs the program code to generate the acknowledgement packet based on the selected RN16.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to efficient decoding of RFID tags based on relevant RN16 selection from a set of responses on multiple receive antennas.

One or more embodiments of the present invention involve spatial reuse, time splitting, and simultaneous reading from multiple ports (that is, Simultaneous Multi-Port reception (SMP)). The main idea of spatial reuse is to split an encountered volume into smaller volumes where each smaller volume is covered by a given antenna. Implementations of this approach require controlling the power transmitted from each antenna port. The idea of time splitting is similar, yet is more sophisticated in the way that it can be achieved. While increasing the number of antennas and controlling the transmit power can potentially partition a bigger volume to smaller chunks where each chunk has limited number of RFID tags, the same approach cannot achieve time-splitting which means that we would like to enable replies only from a certain chunk of the tags in a given time interval. The time splitting technique may be realized though using hardware filtering, where only a set of tags with a particular structure may respond to interrogation from the RFID reader.

The terms "RF backscatter transmitter" and "RF transmit chain" are used interchangeably herein. Moreover, the terms "RF backscatter receiver" and "RF receive chain" and "RFID reader" are used interchangeably herein.

Figure 1:
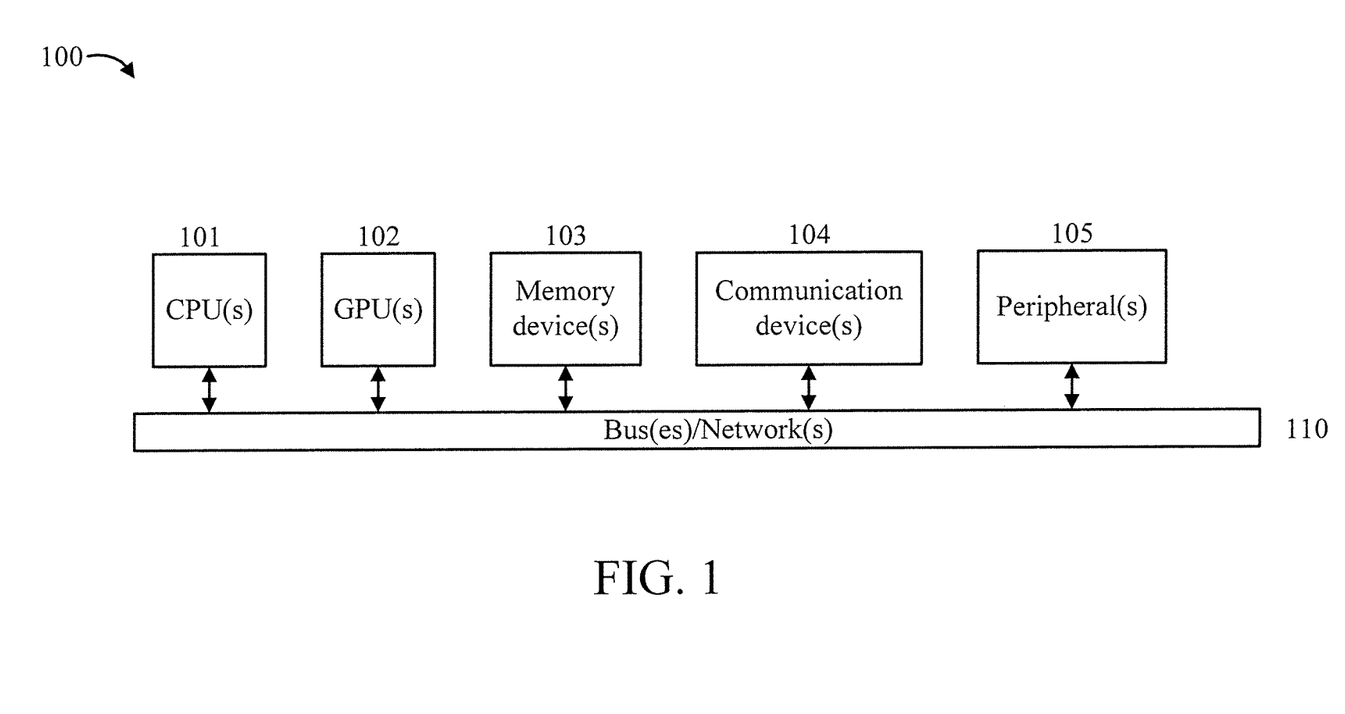
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processor system in a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100. Moreover, system 100 can be used to analyze results of the tagging and to perform actions responsive to tagging results. These and other uses of system 100 are readily determined by one of ordinary skill in the art given the teachings of the present invention provided herein, while maintaining the spirit of the present invention.

Figure 2:
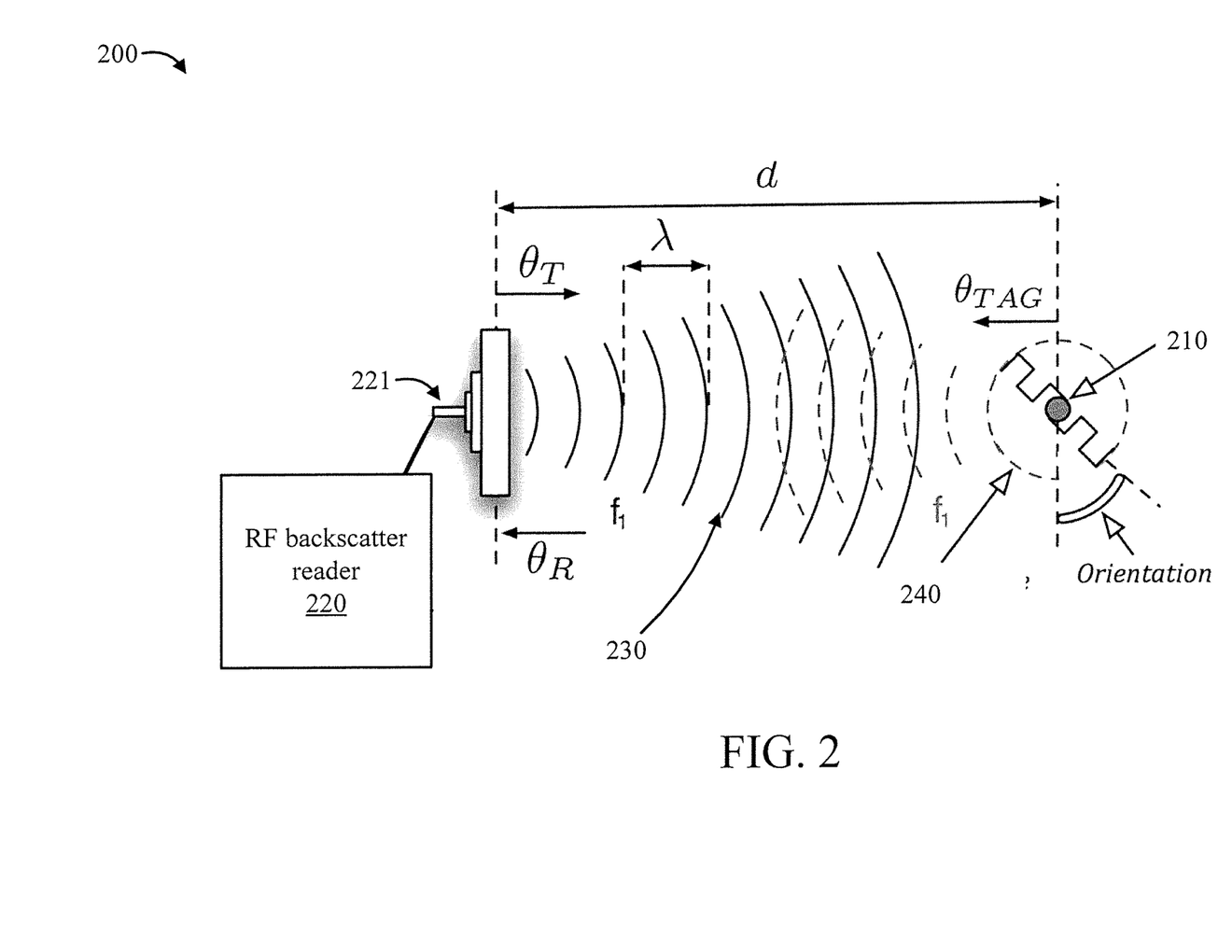
FIG. 2 is a block diagram showing an exemplary RF backscattering mechanism to which the present invention can be applied, in accordance with an embodiment of the present invention.

One or more embodiments of the present invention leverage passive radio frequency (RF) tags to tag and monitor everyday objects. Passive RF tags do not require a battery and cost a few cents each. The RF tags can be pasted onto objects and work by simply backscattering (reflecting) the signal energy sent by the transmitter, thereby eliminating the need to generate their own signal, as shown in FIG. 2. By modulating the state of the reflected signal, the tag is able to convey information stored in it, which could be related to the object that it tags. While the amount of information that can be delivered by a RF tag is limited (few tens to hundreds of Kbps for UHF tags), its low cost, small form factor and passive nature, allows for scalable tagging of everyday objects in consumer spaces.

FIG. 2 is a block diagram showing an exemplary RF backscattering mechanism 200 to which the present invention can be applied, in accordance with an embodiment of the present invention.

The backscattering mechanism 200 involves a passive RF tag 210 and an RF reader 220 with an RF antenna 221. One or more of the preceding elements can be communication devices and/or peripherals of processing system 100 of FIG. 1. While one exemplary tag is shown for the sake of illustration, the present invention is intended to be employed in an environment having many tags, where conventional approaches would suffer the aforementioned deficiencies overcome by embodiments of the present invention described herein with respect to reading the tags in such an environment.

In FIG. 2, d denotes a distance between the RF antenna 221 to the RF tag 210, $\lambda$ denotes a wavelength of the transmitted wave 230, $\theta_T$ denotes the phase of the transmit signal, $\theta_R$ denotes the phase of the backscattered received signal, and $f_1$ denotes a frequency of the transmitted wave 230 and also of the backscatter wave 240.

In operation, a Radio Frequency (RF) wave 230 is transmitted from the antenna 221 of the RF reader 220. Depending upon an orientation of the RF tag 210, the RF wave 230 reflects the RF wave 230 back to the RF antenna 221 as a backscatter wave 240. Moreover, by modulating the state of the reflected signal, i.e., the backscatter wave 240, the passive RF tag 210 is able to convey information stored in the passive RF tag 210.

A description will now be given regarding spatial reuse, in accordance with an embodiment of the present invention.

The main idea of spatial reuse is dedicated antennas configured to excite and read tags in smaller volumes than an entire volume as found (that is, the entire subsuming volume for all the tags), where the number of the tags in each of such smaller volumes is below a threshold. The success of this technique relies on how efficiently the entire reading environment can be partitioned into smaller chunks. Beamforming, power control and frequency allocations are among the main parameters that can control the efficiency of such partitioning. However, there could always be some overlap areas, e.g., at the edge of the partitions.

The transmitted signal from the antennas that correspond to different partitions may be generated in a central interrogator where each transmit antenna is equipped with a simpler transmit/receive capability, such that, for example, the transmit signal is only amplified so that the transmitted signal from the antenna has a certain power. The replies from the tag are then gathered and transmitted back to the central interrogator. Additional capabilities such as frequency conversion, queuing of the received replies, and base-band processing may also be added to the controlling hardware of each antenna.

In a different set up, the antennas for each chunk have a dedicated RF chain and processing unit and in effect each smaller volume or chunk is using a dedicated RFID reader. This approach can handle a much larger aggregate number of tags, but it has a drawback in that the number of RFID readers has to scale with the number of volumes or chunks.

A description will now be given regarding time splitting, in accordance with an embodiment of the present invention.

The technique of time splitting is very powerful and can be performed with most commercial RFID readers. It is noted that the success of the time splitting approach relies on the fact that it is possible to only trigger a given subset of RFID tags that are excited in the read range of the RFID reader. More precisely, once the RFID reader sends the query, many RFID tags that are in range can potentially be excited and woken up. However, the query allows only a given subset of such excited tags to respond. Hence, tag collision may be avoided.

A standard compliant RFID reader allows for defining up to two masks, where each mask defines a portion of a tag identification (ID) number known as an EPC (Electronic Product Code) to be considered. The value of each bit in the mask (or bit-mask) may be also defined. The combination of the value and the mask may be represented as a vector where each item has ternary value that belongs to the set $\{0, 1, x\}$. The mask has a length that is equal to the number of bits in the EPC. The value 0 at a given position of the mask means that the RFID tag is allowed to respond if the corresponding bit in the EPC of the tag is 0. Similarly, the value 1 at a given position of the mask means that only if the EPC of the tag at the corresponding location in EPC is 1, then the tag is included in the query and may respond. The value of 'x' means that the mask does not specify what should be the corresponding value in the EPC, so the EPC may have either 0 or 1 in the corresponding position.

A bit mask may be for example represented as [01xxx10xxx . . . xx11]. The combination of the bit masks in the form of logical 'OR' and logical 'AND' is also possible. An example of the time sharing is the case that for example 4096 tags are in the reading range of RFID while we would like to confine the number of the tags in each time slot to only 256. If we know that the tags for example share a given prefix of length 32, one can consider a 4 bit position in the rest of the EPC (not necessarily consecutive) and fill them with one of the 16 combination of ones and zeros (for example either (0,0,0,0) or (0,1,1,0), etc.) for each query time slot and cycle through these 16 combinations.

We note that the location of such bit positions are usually critical to be chosen correctly. These positions should be picked such that the number of the tags with a given zero and one combination in these bit positions are almost equal to the other cases where the combination of the zeros and ones in these positions are different. Of course, there is no guarantee in doing so unless we completely know the set of tags that are deployed in the environment. However, a rule of thumb is to use the bit values close to the least significant bit positions in the EPC. The reason is that most automated tag generation devices use almost a common prefix in the most significant bits of the EPC and automatically program each RFID tag with a unique EPC by varying the bits that are close to the least significant bits. Nonetheless, in some situations, a few bits (least significant bits) are kept fixed or reserved for parity. Hence, it is usually best to consider a set of least significant bit positions by skipping the first few positions.

A description will now be given regarding Simultaneous Multi-Port Reception (SMP), in accordance with an embodiment of the present invention.

SMP relies on a completely different technique to address the problem of reading a large number of tags in the environment. In SMP, two types of RF chains are considered as follows: a transmit RF chain; and a receive RF chain. Each uni-mode antenna is either connected to a transmit RF chain or receive RF chain. A dual-mode antenna is connected to both a transmit and receive RF chain, for example by using a circulate.

A uni-mode antenna that is connected to a transmit RF chain or a dual-mode antenna are capable of transmitting signal and performing query. A combination of transmit antennas (using any transmit antenna either uni-mode or dual-mode) may also be used to transmit a single stream, e.g., by using analog beamforming.

A uni-mode antenna that is connected to a receive RF chain or a dual-mode antenna are capable of receiving a signal and possibly decoding the received signal. A combination of receive antennas (using any transmit antenna either uni-mode or dual-mode) may also be used to receive a single stream, e.g., by using receive analog beamforming, diversity combining, or digital processing of the received signals.

SMP will be realized when a transmit signal from an antenna is at least received by two receive antennas. For example, consider a scenario that a uni-mode transmit antenna transmits a query and two uni-mode receive antennas at two different locations receive the same reply from the tag in response to the same query. In order to employ SMP, the transmit RF chains and receive RF chains all use a synchronized clock. This means that a very precise coherent detection is possible to be performed by either of the received antennas.

Figure 3:
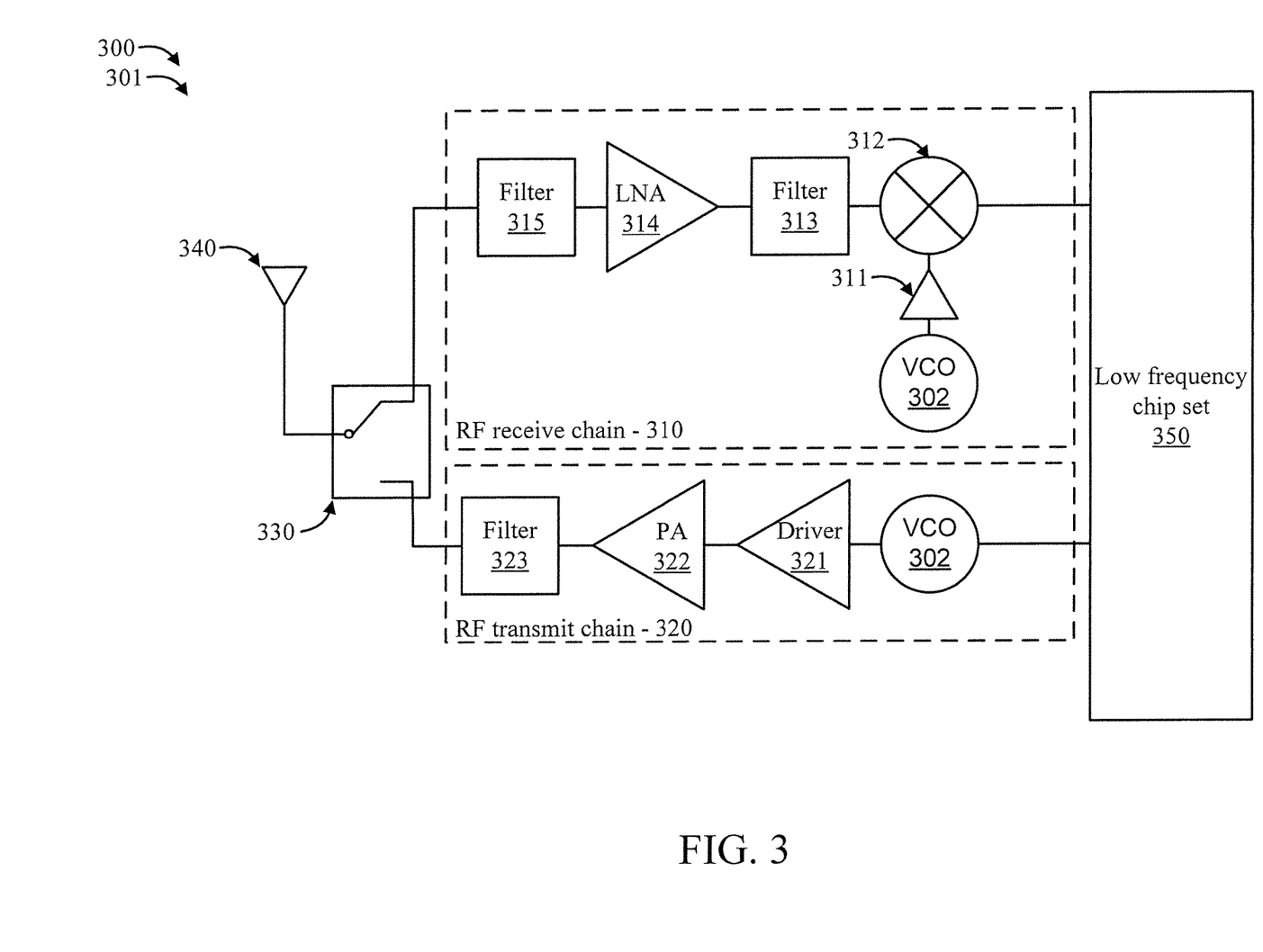
FIG. 3 is a schematic diagram of a communication system element having transmit and receive chains sharing the same VCO, in accordance with an embodiment of the present invention.
Figure 4:
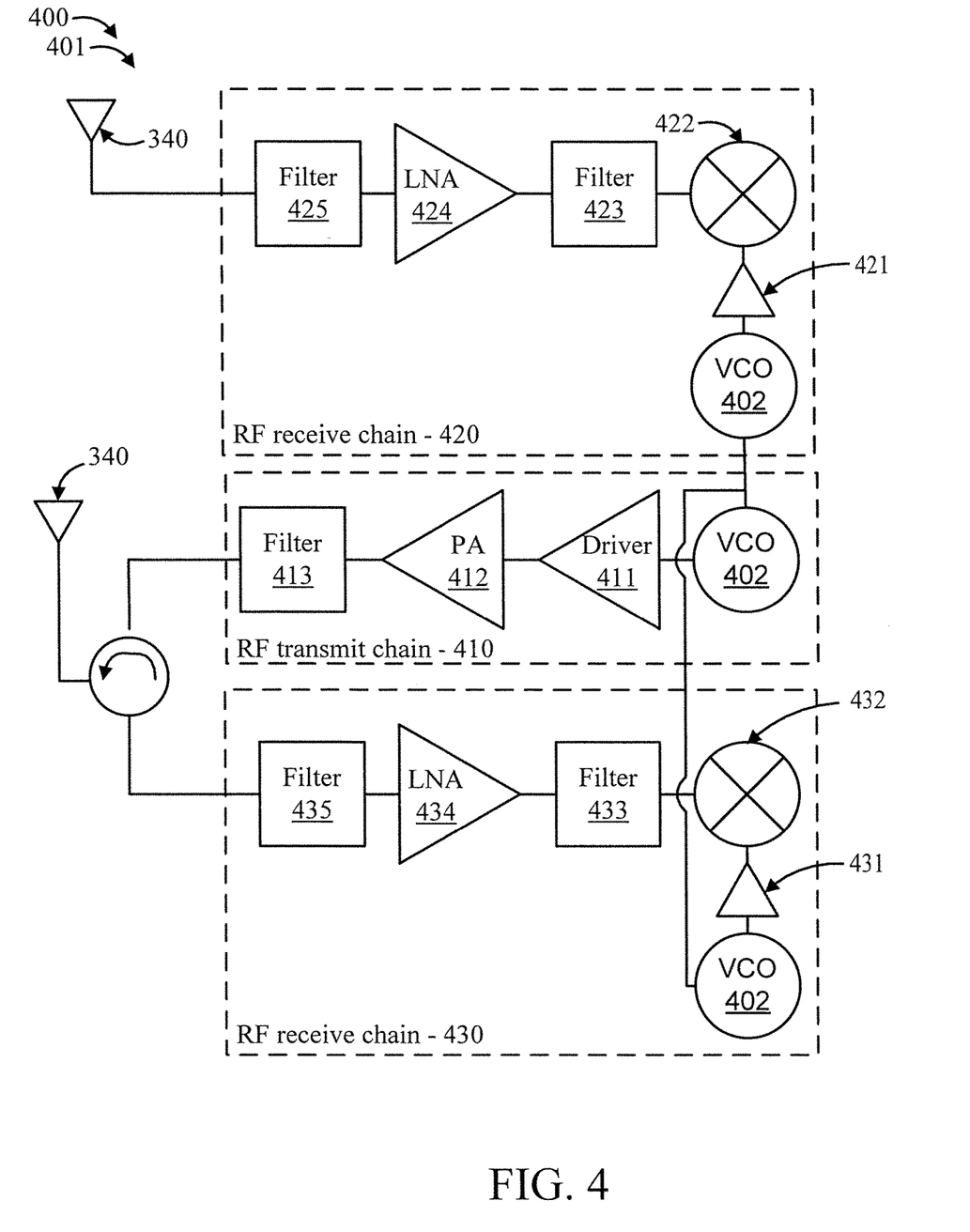
FIG. 4 is a block diagram showing another exemplary communication system element having transmit and receive chains sharing the same VCO, in accordance with an embodiment of the present invention.

FIGS. 3 and 4 are diagrams showing various communication system elements 300 and 400 that, together with many RF backscatter tags, form the same or different communication systems capable of implementing the present invention. Embodiments of communication systems will include one and preferably more than one of any of the elements 300 and/or 400.

FIG. 3 is a schematic diagram of a communication system element 300 having transmit and receive chains sharing the same VCO, in accordance with an embodiment of the present invention. If both RF chains are driven by the same VCO (oscillator), then the antennas may be even placed at different locations and there is no need for switching between the antennas. In a different setup, both RF chains may be attached to the same antenna by using a circulator. In the embodiment of FIG. 3, the VCOs are shared in having a common baseband originated from low frequency chips set 350.

In the embodiment of FIG. 3, the communication system element 300 is a single device 301 that includes both an RF transmit chain 310 and an RF receive chain 320. Embodiments of the present invention include one or preferably more than one communication element 300.

The RF receive chain 320 and the RF transmit chain 310 include a shared VCO 302.

The RF receive chain 310 includes a buffer 311, a mixer 312, a filter 313, a LNA 314, and a filter 315.

The RF transmit chain 320 includes a driver 321, a PA 322, and a filter 323.

The single device 301 includes a Single Pole Double Throw (SPDT) switch 330 for selecting between an active one of the RF chains. The single device 301 further includes an antenna 340 connected to the SPDT switch 330 for switching between transmitting and receiving responsive to a switch position.

The single device 301 includes a shared low frequency chip set 350.

FIG. 4 is a block diagram showing another exemplary communication system element 400 having transmit and receive chains sharing the same VCO, in accordance with an embodiment of the present invention. In configuration 400, a single transmit RF chain 410 is transmitting the interrogation signal and two different receive RF chains 420 and 430 collect the back scatter signals. All RF chains 420 and 430 are using the same oscillator or clock (VCO). As an example, the first receive RF chain 420 is using a separate antenna 421 while the second receive RF chain 430 is using the same antenna as the transmit RF chain 410 by employing a RF circulator.

In the embodiment of FIG. 4, the communication system element 400 is a single device 401 that includes an RF transmit chain 410, a first RF receive chain 420, and a second RF receive chain 430. Embodiments of the present invention include one or preferably more than one communication element 400.

The transmit RF chain 410, the first RF receive chain 420, and the second RF receive chain 430 include a shared VCO 402.

The first RF receive chain 420 includes a buffer 421, a mixer 422, a filter 423, a LNA 424, and a filter 425.

The second RF receive chain 430 includes a buffer 431, a mixer 432, a filter 433, a LNA 434, and a filter 435.

The transmit chain 410 includes a driver 411, a PA 412, and a filter 413.

The single device 401 includes a recirculator 440 for selecting between an active one of the RF chains. The single device 401 further includes an antenna 450 connected to the recirculator 440 for switching between transmitting and receiving responsive to a recirculator state (transmit versus receive).

The processing of the base band signal after the receive RF chain or before the transmit RF chain may be done in a single central location (e.g., shared low frequency chip set 350) or may be done in a distributed manner in different locations by using different processing units.

The processing after the RF chain of each receive antenna may be the same procedure that is performed in the receive RF chain of a dual-mode antenna where both RF chains are fed by the same clock generator board. We note that the synchronization should be at least at the symbol-level/basis. In some scenarios where the phase difference between the transmit and receive signal is used for localization, it is essential to have tighter synchronization which can be referred to as phase synchronized clock. It is usually possible to achieve such synchronization by using a single local oscillator that generates the clock and account for the phase shift in the transmission lines that are used to feed different RF chains.

A description will now be given regarding benefits of the SMP Technique, in accordance with an embodiment of the present invention.

The first benefit of the SMP technique is to reduce the time that is required to read RFID tags especially in areas with large number of tags in the reading range. This is particularly important if a given number of readings has to be collected to perform an algorithm. Since the read rate of SMP may be up to the factor of (number of receive RF chain) higher than for example the time splitting technique, hence, it can potentially collect the required number of readings faster (by the same factor).

Since the antennas may be placed in different locations, using multiple received signals provides different views of the signals that are back scattered from the tag. These observations can provide information about the location of the tag as well. For example, it is possible to perform a variation of a multi-latheration algorithm where the sum of distance of the tag from the transmit antenna and to the received antennas may be calculated by using the phase difference between the transmitted and received signals. Particularly, if the distance between the tag and the i-th transmitter is denoted by $D_i^T$ and the distance between the tag and the j-th receiver is denoted by $d_j^R$, the following simplified model can be used that relates the sum distance $D_i^T + d_j^R$ to the phase difference $Ø_{ij}$ between the transmitted signal from the antenna i and the received signal from the antenna j as follows:

$$D_i^T + d_j^R = \eta(\theta_i^T + \theta_j^R + \theta_{tag} + Ø_{ij} + 2\pi k) \qquad (1)$$

where k is an unknown integer that accounts for the ambiguity in phase difference, and $\theta_i^T$, $\theta_j^R$, and $\theta_{tag}$ are constant additive phase offset that is introduced by the i-th transmitter, j-th receiver, and the tag, respectively.

Another benefit of SMP technique is in moving scenarios and grouping of the tags based on their spatio-temporal proximity. In particular the fact that a simultaneous view of the back scattered signal from the tag is obtained in multiple receive antenna locations, this information is better representative of the spatio-temporal path of the tag and it is also easier to collect considerably larger number of readings at shorter time intervals. For example, a neural network may be used to learn the proximity between two tags or simply learning an embedding distance between two tag trajectories by looking at their readings in a given time interval. The SMP algorithm can arguably shorten the length of such intervals by an order of magnitude without sacrificing its accuracy.

Figure 5:
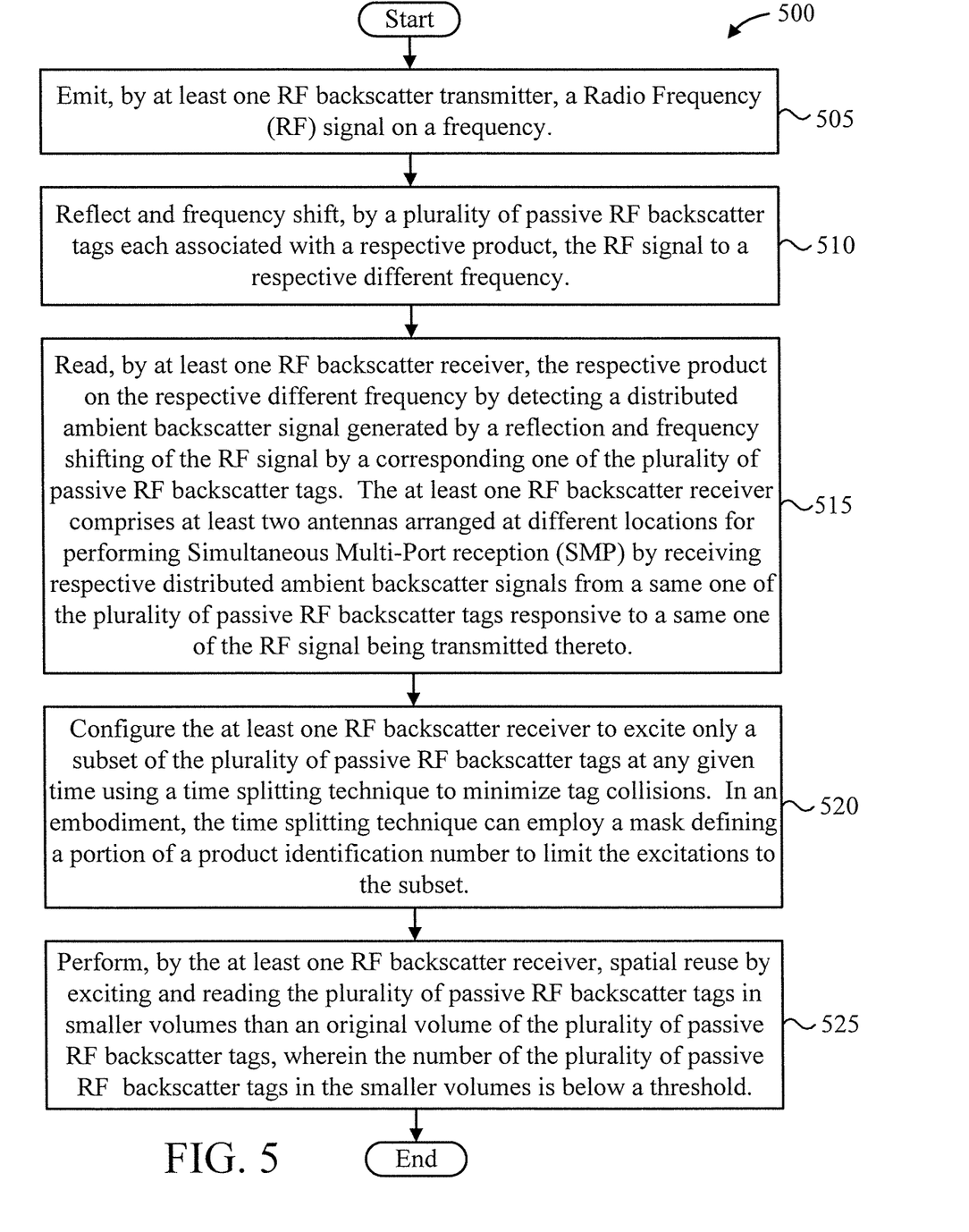
FIG. 5 is a flow diagram showing an exemplary method for crowded RFID reading, in accordance with an embodiment of the present invention.

FIG. 5 is a flow diagram showing an exemplary method 500 for crowded RFID reading, in accordance with an embodiment of the present invention. Method 500 can be performed using one or more of the communication system element 300 of FIG. 3 and/or the communication system element 400 of FIG. 4. Method 500 is intended to be performed in an environment having many tags, while providing optimum performance and minimum conflict if any.

At block 505, emit, by at least one RF backscatter transmitter, a Radio Frequency (RF) signal on a frequency.

At block 510, reflect and frequency shift, by a plurality of passive RF backscatter tags each associated with a respective product, the RF signal to a respective different frequency.

At block 515, read, by at least one RF backscatter receiver, the respective product on the respective different frequency by detecting a distributed ambient backscatter signal generated by a reflection and frequency shifting of the RF signal by a corresponding one of the plurality of passive RF backscatter tags. The at least one RF backscatter receiver comprises at least two antennas arranged at different locations for performing Simultaneous Multi-Port reception (SMP) by receiving respective distributed ambient backscatter signals from a same one of the plurality of passive RF backscatter tags responsive to a same one of the RF signal being transmitted thereto. Each of the at least RF backscatter transmitter and the at least one RF backscatter receiver include a respective synchronized clock for the SMP.

At block 520, configure the at least one RF backscatter receiver to excite only a subset of the plurality of passive RF backscatter tags at any given time using a time splitting technique to minimize tag collisions. In an embodiment, the time splitting technique can employ a mask defining a portion of a product identification number to limit the excitations to the subset.

At block 525, perform, by the at least one RF backscatter receiver, spatial reuse by exciting and reading the plurality of passive RF backscatter tags in smaller volumes than an original volume of the plurality of passive RF backscatter tags, wherein the number of the plurality of passive RF backscatter tags in the smaller volumes is below a threshold.

In an embodiment, one or more of blocks 515, 520, and 525 can be performed concurrently.

A description will now be given regarding efficient decoding of RFID tags based on relevant RN16 selection from a set of responses on multiple receive antennas.

Figure 6:
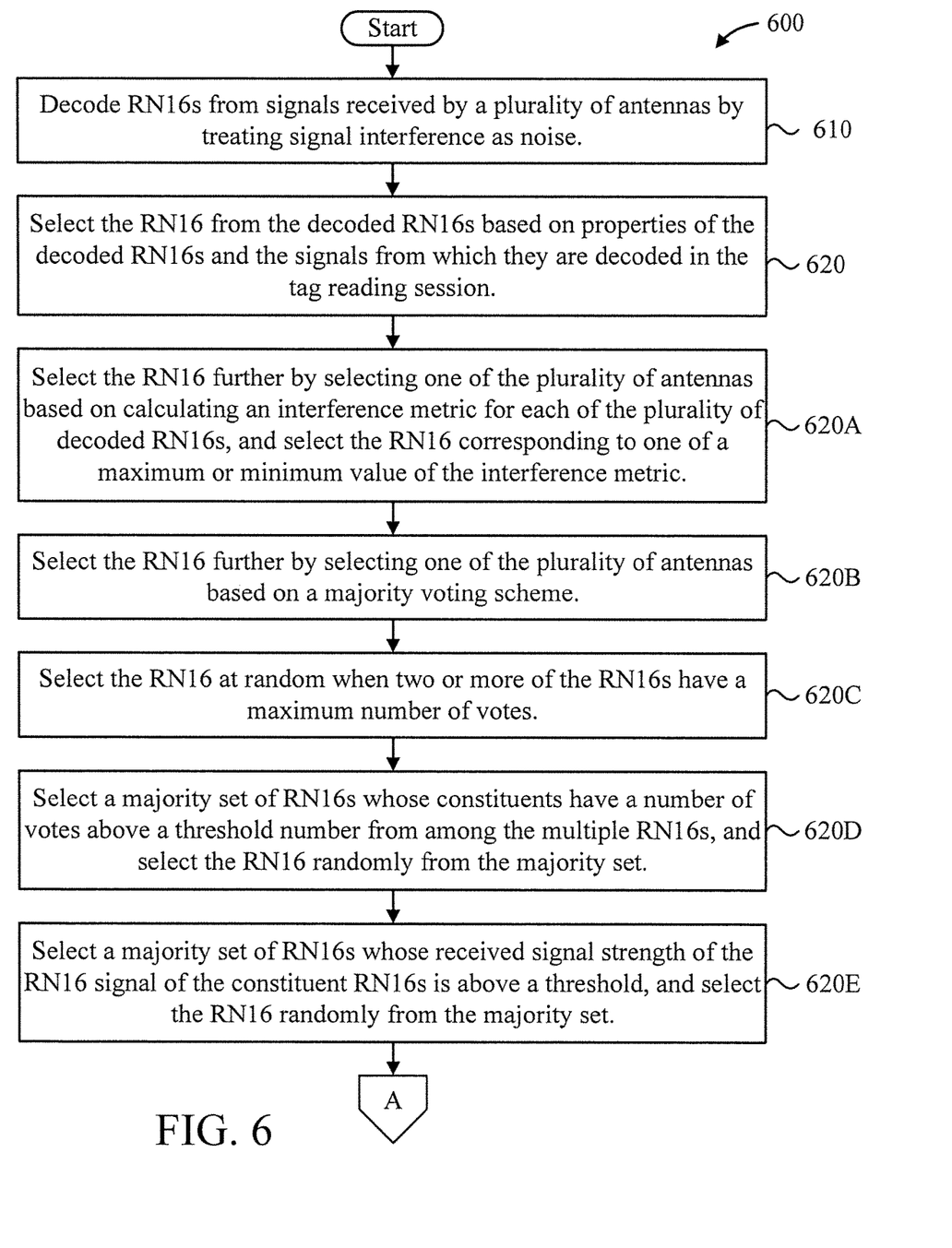
FIGS. 6-7 are flow diagrams showing an exemplary method 600 for efficient decoding of RFID tags based on the relevant 16 digit random sequence (RN16) selection from a set of responses on multiple receive antennas.
Figure 7:
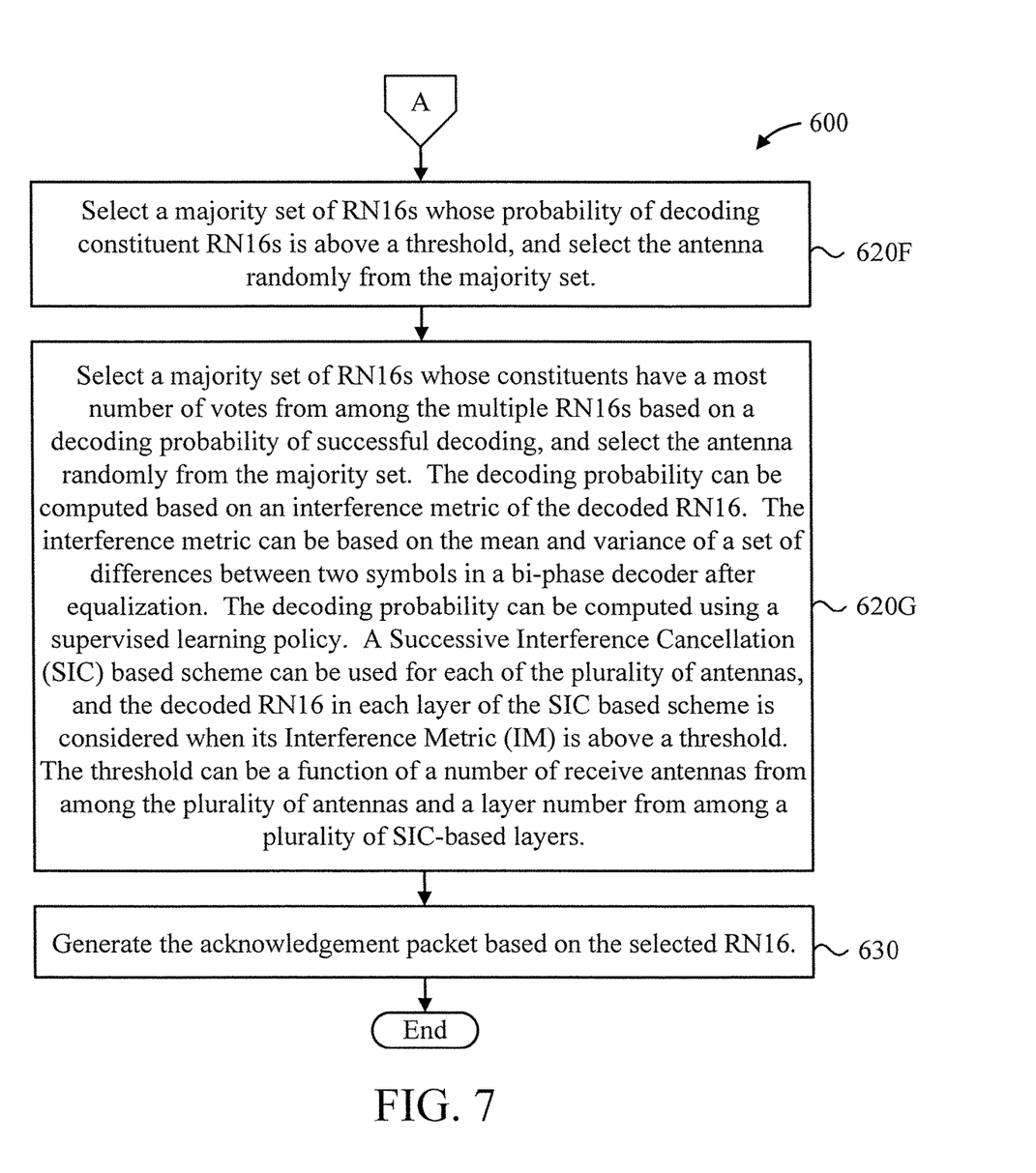

FIGS. 6-7 are flow diagrams showing an exemplary method 600 for efficient decoding of RFID tags based on the relevant 16 digit random sequence (RN16) selection from a set of responses on multiple receive antennas.

At block 610, decode RN16s from signals received by a plurality of antennas by treating signal interference as noise.

At block 620, select the RN16 from the decoded RN16s based on properties of the decoded RN16s and the signals from which they are decoded in the tag reading session.

In an embodiment, block 610 can include one or more of blocks 610A through 610G.

At block 620A, select the RN16 further by selecting one of the plurality of antennas based on calculating an interference metric for each of the plurality of decoded RN16s, and select the RN16 corresponding to one of a maximum or minimum value of the interference metric. The interference metric can be based on the mean and variance of a set of differences between two symbols in a bi-phase decoder after equalization.

At block 620B, select the RN16 further by selecting one of the plurality of antennas based on a majority voting scheme. In an embodiment, each of the decoded RN16s from the plurality of antennas in a single session receives votes based on a number of antennas that decoded the decoded RN16s, and an antenna is selected which corresponds to the decoded RN16 which has a maximum number of votes.

At block 620C, select the antenna at random when two or more of the plurality of antennas have a maximum number of votes.

At block 620D, select a majority set of RN16s whose constituents have a number of votes above a threshold number from among the multiple RN16s, and select the RN16 randomly from the majority set.

At block 620E, select a majority set of RN16s whose received signal strength of the RN16 signal of the constituent RN16s is above a threshold, and select the RN16 randomly from the majority set.

At block 620F, select a majority set of RN16s whose probability of decoding constituent RN16s is above a threshold, and select the antenna RN16 from the majority set.

At block 610G, select a majority set of RN16s whose constituents have a most number of votes from among the multiple RN16s based on a decoding probability of successful decoding, and select the RN16 randomly from the majority set. In an embodiment, the decoding probability can be computed based on an interference metric of the decoded RN16. In an embodiment, the interference metric can be based on the mean and variance of a set of differences between two symbols in a bi-phase decoder after equalization. In an embodiment, the decoding probability can be computed using a supervised learning policy. In an embodiment, a Successive Interference Cancellation (SIC) based scheme can be used for each of the plurality of antennas, and the decoded RN16 in each layer of the SIC based scheme is considered when its Interference Metric (IM) is above a threshold. In an embodiment, the threshold can be a function of a number of receive antennas from among the plurality of antennas and a layer number from among a plurality of SIC-based layers.

At block 630, generate the acknowledgement packet based on the selected RN16.

A description will now be given regarding an introduction of an aspect of the present invention directed to efficient decoding on RFID tags based on relevant RN16 selection from a set of responses on multiple receive antennas, in accordance with an embodiment of the present invention.

A standard compliant custom designed RFID reader is considered, equipped with multiple antennas which are capable of receiving a reply from a tag from multiple antennas (i.e., simultaneous multi-port reception (SMPR or SMP-RX)). When a tag responds to a query, rep query, select query, or query adjust command from a reader, the reader may receive multiple copies of the tags response from each of its antennas and consequently transmit a message such as acknowledgement to the tag based on the initial response from the tag which includes a 16 digit random sequence known as RN16. Having multiple observation of the tags response would help in decreasing the decoding error in all phases of communicating with the tag including the initial RN16 decoding.

When multiple tags are responding at the same time slot, the superposition of their signal is received at each of the received antennas. Such multiple observation increases the chance of resolving the interference between multiple tags as their signal will be likely received with different powers at different antenna locations.

It is noted that each receive antennas would be synchronized with the transmit antenna in order to be able to minimize the effect of the local oscillator drift across different antennas. This is particularly important since the communication between an RFID reader and an RFID tag is based on backscatter communication.

Herein, it is focused on (1) improving the efficiency of decoding of RN16, and (2) possible selection of RN16 based on different metrics, and (3) possible selection of particular tags, e.g., the tags that are normally disfavored in the decoding process, or selecting different tags in some inventory rounds in order to increase the possibility of discovering more tags or disfavored tags.

A description will now be given regarding performance metrics, in accordance with an embodiment of the present invention.

In this section, we define particular performance metrics of interest in regard to the decoding of an RFID tag. Although these metrics may be defined for different communication scenarios between a reader and a RFID tag, such as selective memory read/write, etc., most of the discussion may be assumed to be a two phase communication between the tag and reader for the ease of interpretation. A time slot is the time in which both of the communication phases happen in sequence. In the first phase the reader performs a form of query and a tag replies with RN16. In the second phase the reader select a decoded RN16 and send an acknowledgement packet for the selected RN16 and the tag which had chosen this RN16 replies with its tag ID which is equivalently defined as an EPC (Electronic Product Code).

The first metric is the discovery rate which is defined as the rate of discovering a unique tag over time. The discovery probability or $P_{dcv}$ is the probability of decoding an unvisited EPC in a particular time slot.

The second metric is the decoding rate which is defined as the rate of decoding per time slot. Also, the decoding probability $P_{dcd}$ is defined as the probability of decoding a valid EPC during a time slot. In most cases when in a time slot only one tag replies and there is no interference, we have $P_{dcd} \cong 1$. In other words, if signal to the noise and interference ratio (SINR) is high enough for a tag reply it is almost surely decoded.

We note that if a tag is responding for a first time, say during an inventory round, and $P_{dcd}=1$, we have $P_{dcv}=1$. The difference between the decoding rate and the discovery rate is that in the decoding rate, the decoded EPCs do not need to be unique while in the definition of the discovery, we are interested in the rate of discovering unique tags.

The third metric is the multi-decoding rate or total EPC decoding rate defined as the rate of decoding EPC packets over time. When there is only one receive antennas the multi-decoding rate is simply equal to the decoding rate. However, by employing multiple receive antennas, each antenna can potentially decode an EPC when the tag replies. Such replies carry the same EPC but have different attributes such as SINR, received signal power (RSSI), phase, and doppler. These attributes along with the information about which transmit antenna and which receive antenna where used to decode this EPC packet provide different view of the tag response which are useful in many applications such as grouping, tracking, multi-latheration, localization, gesture discovery, classification, checkout systems, etc.

The fourth metric is defined as the possibility of decoding EPC from weak tag replies. This possibility may be increased by having multiple observation of the received RN16 by multiple receive antennas. In particular when multiple tag reply in the same time slot, one may be interested in not decoding the RN16 with strongest presence in such replies, but the second or third (or any other) strongest RN16 replies. This could for example be useful to increase the discovery rate as well.

An important observation is that once a system can correctly decode for example the second strongest RN16 from the tag replies and generates an acknowledgement based on this RN16, in the second communication phase, only this tag would reply with its EPC and decoding of the EPC would be possible without other interference by other tags. This means that even some antennas that were not able to decode RN16 of this tag in the first place can now actively participate in the decoding of its EPC and possibly decode the EPC with different attributes.

The fifth metric deals with selecting or isolating a particular tag. This may be done by doing for example a time series analysis, or AI analysis of the RN16 decodability and its attributes by multiple antennas over time. Such analysis can identify a tag based on its behavior and its replies over time for example to select the RN16 from this tag in a particular time slot. This feature extraction algorithm is particularly important since in the first communication phase the RN16 does not directly map to any particular tag as it is chosen randomly each time by a tag. However, by such time-series analysis, one can notice for example the existence of a tag with a weak reply which is masked by the reply from other tags. Such AI analysis may include finding the pdf of the SINR for a particular RN16 and using classifications based on calculating the likelihood of having a valid RN16 present in a set of tag replies over multiple antennas.

We note that all these metric may be affected by the notion of session as well as the selective query defined in RFID generation 2 standard. Nonetheless, this invention deals with improving either of these metric irrespective of using the concept of the session. This means that even if no session is used or without particular setting of a select tags we would like to improve these metrics. Of course, the improvement with or without using the selective query and using particular session varies and the respective algorithm would be adapted accordingly.

A description will now be given regarding policy, in accordance with an embodiment of the present invention.

When multiple receiver attempt to decode an RN16, they may be using a multi-user detection/decoding technique to combine physical layer samples from multiple antennas before decoding. Such process is not impossible but practically very hard to achieve considering a very short time that is available to decode an RN16 and transmit the acknowledgement packet. Therefore, we assume decoding is done in parallel for each receiver. Nonetheless, we assume a pre- and post-decoding process in which one can improve the decoding capability for one or more performance metrics defined earlier. This process is called policy. An example of pre-processing is a round robin policy in which we select which antenna to be chosen for decoding an RN16. An example of post-processing is majority voting policy in which multiple antennas perform decoding of an RN16 in parallel and majority voting selects the RN16 which has been decoded the most by the receivers.

We note that the policy only applies to the first phase of the communication and in decoding of an RN16. In the second phase of the communication in each slot, since only one RN16 is chosen and an acknowledgement packet is sent based on this RN16, all antennas will participate in decoding of the EPC.

A description will now be given regarding primitive policies, in accordance with an embodiment of the present invention.

Fixed antenna policy: The policy could be as simple as choosing a fixed antenna for the decoding of RN16 in every slot. Such policy may favor particular set of tags for example the tags that are located in a special volume in the space.

Round robin policy: In order to alleviate the problem with the fixed antenna policy, one may choose different antennas one by one in a round robin fashion. This policy would have better coverage of the space and would result in a better discovery probability but the decoding rate and multi-decoding rate may be affected due to the fact that when in a given time slot a particular antenna is chosen, that antenna might not be receiving any tag reply or the replies might have been interfering in a way that none of the replies is resolvable.

Probabilistic fixed set policy: This policy chooses an antenna from a given set at any time slot in a probabilistic fashion. The set itself may be a function of the time slot, e.g., similar to the way that round robin policy changes the antenna per time slot.

A description will now be given regarding majority voting, in accordance with an embodiment of the present invention.

This policy is based on the RN16 value retrieved by each independent receiver chain. In this policy, we choose the RN16 that is most repeated among the RN16 decoded by the receivers. In the event of not having a replicated RN16, the system may enforce a different policy, for example to select an antenna at random, use a fixed antenna, or use round robin policy. The advantage of this policy is that it exploits diversity at reception to combat fading and interference.

The majority voting can improve the decoding and multi-decoding rage but it may adversely affect the discovery rate by always favoring particular set of tags that are situated in better positions in terms of receiving their signal by the receiver. However, one can use the following extension to alleviate the problem with the discovery of the tags with weak replies.

The majority voting policy may be extended in several ways: First, if there are more than one RN16 which has the maximum number of votes, one may be selected at random. Second, Majority voting can have a probabilistic nature as well, meaning that one may select a majority set of RN16 values that have the most number of votes and then select one RN16 from the majority set at random. In generating the majority set, one may assume that the number of RN16 in the majority set is given, or it has a maximum or minimum bound. Alternatively, one can assume that an RN16 may belong to the majority set if the number of votes is maximum or within a bound from the maximum.

A description will now be given regarding interference metric based policy (PIM), in accordance with an embodiment of the present invention.

Imagine N tags that choose to reply at slot p0. The combined signal at the receiver can be expressed as $y = \Sigma h^{(i)} \cdot s^{(i)} + n$. Here, $s^{(i)}$ represents the FM0 symbols from tag i, $h^{(i)}$ the channel response in at-fading conditions and n is the AWGN. Assuming that the tag replies are synchronous and knowing that the FM0 modulation only transmits either 0's or 1's, we can express the received signal as a linear combination of the channel responses at any given time j. That is, $y_j \Sigma h^{(i)} \cdot s_j^{(i)} + n_j$, where $s_j^{(i)}$ represents the symbol (0/1) from tag reply i at instant j. The clusters ($\wedge$) are the linear combination of the channels $h^{(i)} \forall_i$ with a dispersion mandated by the noise power σ2.

Other proposals aim at resolving the collisions based on predicting the number of clusters and solving the aforementioned linear equations. However, this procedure has a relatively high complexity that may not be compatible with the timings that has to be maintained in communication between the tag and RFID reader dictated by the standard. Furthermore, standard quality metrics such as the Signal-To-Interference-Noise-Ratio (SINR) require of the computation of the three components separately: desired signal; interference; and noise. During the RN16 reading phase, the system has not decided on the tag to reply to, hence desired signal and interference are not yet defined at this stage. Lastly, the backscattering component creates inter-tag interference in addition to the digital interference that hinders the power assessment.

We propose the use of a low-complexity quality metric called Interference metric (IM), where each independent receiver uses the demodulated symbols from FM0-encoded RN16 to assess the probability of successful decoding ($P_{dcd}$). Upon computing $P_{dcd}$ at each receiver, the system selects the RN16 with the highest $P_{dcd}$.

In order to map IM values to $P_{dcd}$, the system needs to learn from the environment. Thus, defining a supervised learning policy consisting of an initial training procedure and a subsequent testing.

Training: During the training stage, the system employs one of the conventional RN16 selection policies described previously. At every slot, we store (1) the interference metric and (2) whether the EPC was retrieved successfully or not. These procedure is repeated multiple times, each of them with different number of tags as to expose the system to different levels of interference. At the end of the training stage, the results are averaged and stored into a file. The file is conceived as a look-up-table (LUT), mapping IM empirical values into actual empirical probabilities.

Modeling: We present our IM model as $$Y = \frac{1}{\left(1 + \exp\left(\frac{x - \alpha}{\beta}\right)\right)},$$

defining a modified inverse Sigmoid function with hyper-parameters α and β. Modeling eases the computation by avoiding retrieving values from an external source and computing a one-to-one Euclidean distance to all entries in the LUT. Therefore, the model simplifies the number of operations and allows for a faster execution.

Testing: Finally, the trained Sigmoid model is introduced as a function to be called under the IM Policy. Once again, the system selects the RN16 for whom the model returns the highest $P_{dcd}$.

Understanding IM: The IM is extracted directly over the FM0 symbols transmitted from the Tags to the Interrogator or Reader. The FM0 decoder is fairly simple: once the start of the Payload is determined, the demodulator enforces a differential decoding, where two symbols that differ in their amplitudes are treated as a 0 whereas a similar amplitude will be read as a 1. We make the following observation—the goodness of a symbol decoding using an FM0 demodulator can be inferred by (i) the mean amplitude across the symbols (μ) and (ii) the sample covariance (SC) of the symbols. Thus, we define IM as $\sqrt{SC}/\mu$.

The procedure can be summarized as: (step 1) the FM0 demodulator computes the difference between two symbols and equalizes it using the channel estimation, generating a clean differential real vector of symbols that we refer to as p. (Step 2) we compute the mean p and subtract it to all the symbols, as $p_i - \mu_p \forall i \in p$ (Step 3). We compute the absolute value of the resulting p. (Step 4) We compute the sample covariance (SC) of |p|. (Step 5) Lastly, we compute the IM as $$\frac{SC(|p|)}{\mu_p}.$$

The IM based policy is then defined as the policy which selects the RN16 decoded by the receiver which has the highest decoding probability, wherein the decoding probability of each receiver is found though a function (either as a table look up or modelled version such as sigmoid function) which maps the IM values for each receiver to its decoding probability, wherein the IM is defined as above.

The IM based policy may also be randomized by selecting a subset of receivers with highest decoding probability (say above a threshold) and then select one from this set at random.

A description will now be given regarding RSSI- and phase-based reading-oriented policy, in accordance with an embodiment of the present invention.

Similar to IM policy, the RSSI-Phase-based policy is a supervised learning algorithm.

Training: During the training stage, the system employs one of the conventional RN16 selection policies described previously. At every slot, the following is stored: (1) the RSS; (2) the Phase; and (3) whether the EPC was retrieved successfully or not. This procedure is repeated multiple times, each of them with different number of tags as to expose the system to different levels of interference. At the end of the training stage, the results are averaged and stored into 3 files: rssi-only; phase-only; and rssi-phase combined. The file is conceived as a look-up-table (LUT), mapping the quality metrics of RSS and phase into empirical probabilities.

Self-jamming is caused by the self-inflicted interference in the reader through the full-duplex communication with the tag. Readers are not equipped with self-interference cancellation stages, which rises the power threshold for tag responses to be decoded successfully.

Finally, these results are aggregated and averaged to build a map, where the X- and Y-axes map to RSSI and Phase values, and the Z-axis map to the empirically measured probability to successfully decode an EPC. Once the network is trained, the probabilities from the maps are compared amongst the antennas and the port with the highest one is selected as valid RN16.

Testing: Finally, the LUT for each TX-RX pair is consulted at every RN16 decoding stage by the pertinent TX-RX that are active. For instance, having transmitter p active at time to, each receiver will consult their dedicated LUT for the trained data with transmitter p. Once again, the system selects the RN16 for whom the LUT's returns the highest $P_{cdc}$.

A description will now be given regarding a discovery-oriented policy, in accordance with an embodiment of the present invention.

While the previous policy attempted at maximizing $P_{dcv}$, a policy is proposed that targets maximizing $P_{dcd}$. In the realm of Reinforcement Learning, this policy enforces exploration whereas the previous enforces exploitation. To that end, we use features such as the RSSI and the number of readings from multiple antennas to infer whether the detected RN16 has been previously visited or not. Ultimately, the system of the present invention will try to classify the decoded RN16 as visited or un-visited.

The RSSI is a feature that is easily extracted from the signal, i.e. does not incur in extra computation time, and also offers robustness against mobility. In a scenario with restricted mobility like our checkout area, the RSSI becomes even more reliable than other metrics such as the phase. Mild mobility in the environment causes drastic deviations in the phase, but not to the RSS. Therefore, it is a feature we can use to classify tags. However, and as shown in literature, it is not a sufficient feature. This is expanded with our multiple visualization via our SMP framework.

For sake of example, imagine an SMPR working with 6 antennas capturing replies from 2 tags, colliding at time t0. Now, say receivers r1, r2, r3 and r4 decoded RN161 with measured RSSI RSSI1, RSSI2, RSSI3 and RSSI4; and receivers r5 and r6 decoded RN162 with measured RSSI RSSI5 and RSSI6. The system wants to enforce "Discovery-oriented policy", so it looks at previously decoded RN16 with similar RSSI levels across the antennas. It realizes that RSSI1, RSSI2, RSSI3 and RSSI4 measures were close to an entry in the previously discovered tags table. Therefore, it decides to encapsulate RN162 in the ACK, aiming for exploration.

A description will now be given regarding a Successive Interference Cancellation (SIC) based policy, in accordance with an embodiment of the present invention.

This policy attempts to resolve collisions via interference suppression techniques. Each receiver port undergoes an iterative policy for interference suppression and RN16 retrieval. Each iteration includes the following steps: First, the RN16 is retrieved along with the $P_d$ for the strongest received signal by treating the other signals as noise. Second, we reconstruct the samples based on the physical layer parameters corresponding with this decoded RN16 particularly considering the sampling rate and power of this signal. Then, the reconstructed signal is subtracted from the originally received samples, resulting in either noise (no other reply was present) or hidden replies (one or more tags were colliding). The procedure can be repeated to decode multiple RN16. For each of these iterations, we can rely on the value of IM (defined earlier) to estimate the probability of decoding $P_{dcd}$. The values of RN16 and $P_{dcd}$ are stored for each iteration. Finally, the SIC based policy select one RN16 by considering the set of such decoded RN16 and their decoding probability estimates these values for all or a subset of antennas. Such SIC based policy may use randomization as well. For example, it may choose any set of RN16 from the set of all available RN16 values that have decoding probability that is higher than a threshold and then select one from this set at random. A combination of majority voting and SIC based policy is also possible.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for picking a 16-bit random sequence (RN16) and generating an acknowledgement packet in a tag reading session, comprising:

decoding RN16s from signals received by a plurality of antennas by treating signal interference as noise;

selecting the RN16 from the decoded RN16s based on properties of the decoded RN16s and the signals from which they are decoded in the tag reading session; and generating the acknowledgement packet based on the selected RN16, wherein the RN16 is selected further by selecting one of the plurality of antennas based on calculating an interference metric for each of the plurality of decoded RN16s and selecting the RN16 corresponding to one of a maximum or minimum value of the interference metric, and wherein the interference metric is based on the mean and variance of a set of differences between two symbols in a bi-phase decoder after equalization.

2. The computer-implemented method of claim 1, wherein the RN16 is selected further by selecting one of the plurality of antennas based on a majority voting scheme.

3. The computer-implemented method of claim 2, wherein each of the decoded RN16s from the plurality of antennas in a single session receive votes based on a number of antennas that decoded the decoded RN16s, and an antenna is selected which corresponds to the decoded RN16 which has a maximum number of votes.

4. The computer-implemented method of claim 2, wherein the RN16 is selected at random when two or more of the RN16s have a maximum number of votes.

5. The computer-implemented method of claim 2, further comprising:

selecting a majority set of RN16s whose constituents have a number of votes above a threshold number from among the multiple RN16s; and selecting the RN16 randomly from the majority set.

6. The computer-implemented method of claim 2, further comprising:

selecting a majority set of RN16s whose received signal strength of the RN16 signal of the constituent RN16s is above a threshold; and selecting the RN16 randomly from the majority set.

7. The computer-implemented method of claim 2, further comprising:

selecting a majority set of RN16s whose probability of decoding constituent RN16s is above a threshold selecting the RN16 randomly from the majority set.

8. The computer-implemented method of claim 7, wherein the probability of decoding is computed based on an interference metric of the decoded RN16.

9. The computer-implemented method of claim 8, wherein the interference metric is based on the mean and variance of a set of differences between two symbols in a bi-phase decoder after equalization.

10. The computer-implemented method of claim 7, wherein the probability of decoding is computed using a supervised learning policy.

11. The computer-implemented method of claim 1, wherein the RF chain of a transmit antenna and a receive antenna from among the plurality of antennas have a synchronized carrier signal.

12. The computer-implemented method of claim 1, wherein a Successive Interference Cancellation (SIC) based scheme is used for each of the plurality of antennas, and the decoded RN16 in each layer of the SIC based scheme is considered when its Interference Metric (IM) is above a threshold.

13. The computer-implemented method of claim 12, wherein the threshold is a function of a number of receive antennas from among the plurality of antennas and a layer number from among a plurality of SIC-based layers.

14. A non-transitory computer program product for picking a 16-bit random sequence (RN16) and generating an acknowledgement packet in a tag reading session, the computer program product comprising a non-transitory computer readable storage medium having program instructions embodied therewith, the program instructions executable by a computer to cause the computer to perform a method comprising:

decoding RN16s from signals received by a plurality of antennas by treating signal interference as noise;

selecting the RN16 from the decoded RN16s based on properties of the decoded RN16s and the signals from which they are decoded in the tag reading session; and generating the acknowledgement packet based on the selected RN16, wherein the RN16 is selected further by selecting one of the plurality of antennas based on calculating an interference metric for each of the plurality of decoded RN16s and selecting the RN16 corresponding to one of a maximum or minimum value of the interference metric, and wherein the interference metric is based on the mean and variance of a set of differences between two symbols in a bi-phase decoder after equalization.

15. The non-transitory computer program product of claim 14, wherein the RN16 is selected further by selecting one of the plurality of antennas based on a majority voting scheme.

16. A computer processing system for picking a 16-bit random sequence (RN16) and generating an acknowledgement packet in a tag reading session, comprising:

a memory device for storing program code; and a processor device operatively coupled to the memory device for running the program code to:

decode RN16s from signals received by a plurality of antennas by treating signal interference as noise, select the RN16 from the decoded RN16s based on properties of the decoded RN16s and the signals from which they are decoded in the tag reading session; and generate the acknowledgement packet based on the selected RN16, wherein the RN16 is selected further by selecting one of the plurality of antennas based on calculating an interference metric for each of the plurality of decoded RN16s and selecting the RN16 corresponding to one of a maximum or minimum value of the interference metric, and wherein the interference metric is based on the mean and variance of a set of differences between two symbols in a bi-phase decoder after equalization.

* * * * *